Figure 1:
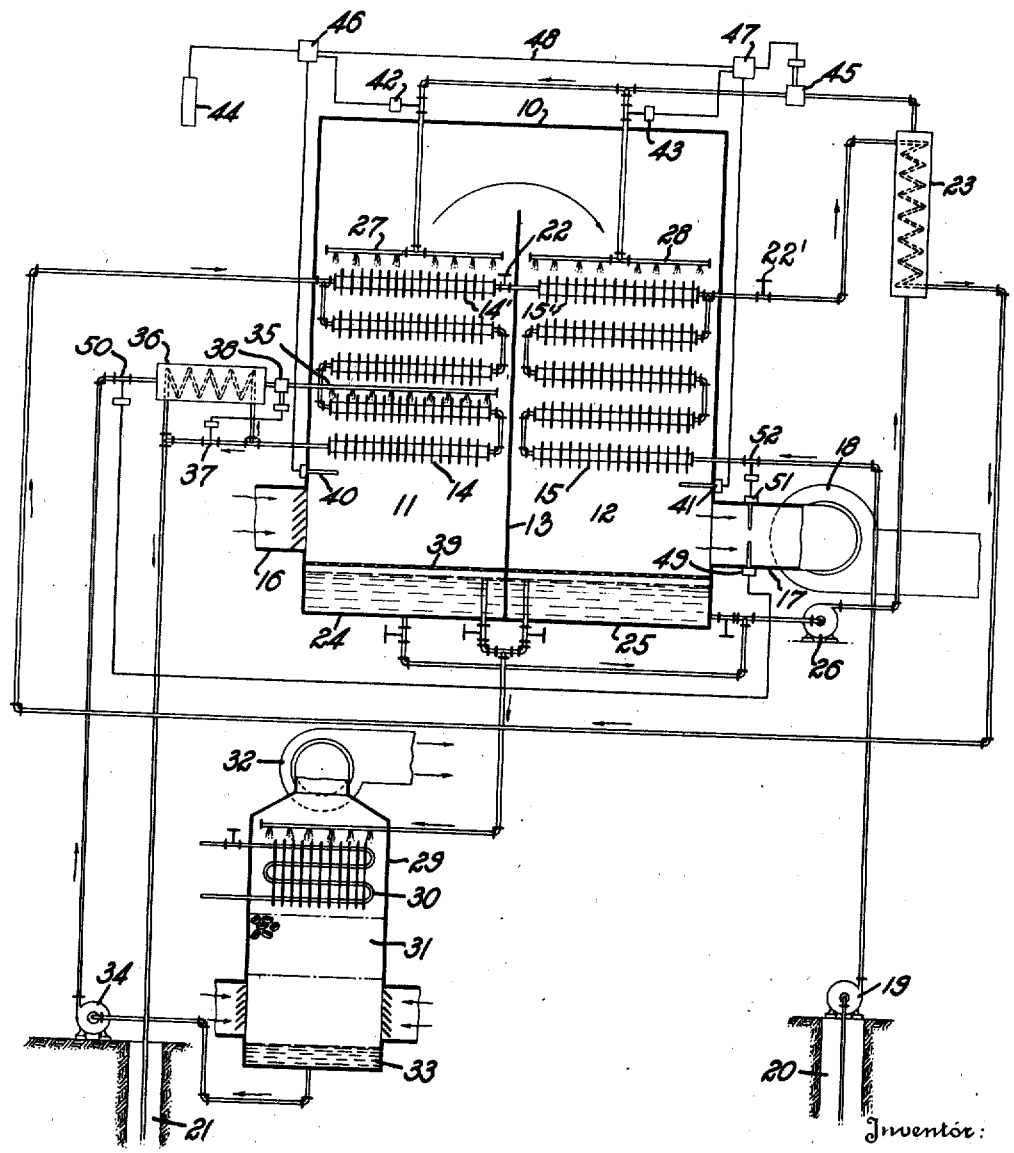

April 21, 1942.

R. B. P. CRAWFORD 2,280,633

AIR CONDITIONING

Filed Dec. 20, 1939

2 Sheets-Sheet 1

Inventor:
Robert B. P. Crawford
By Potter, Pierce & Scheffler
Attorneys

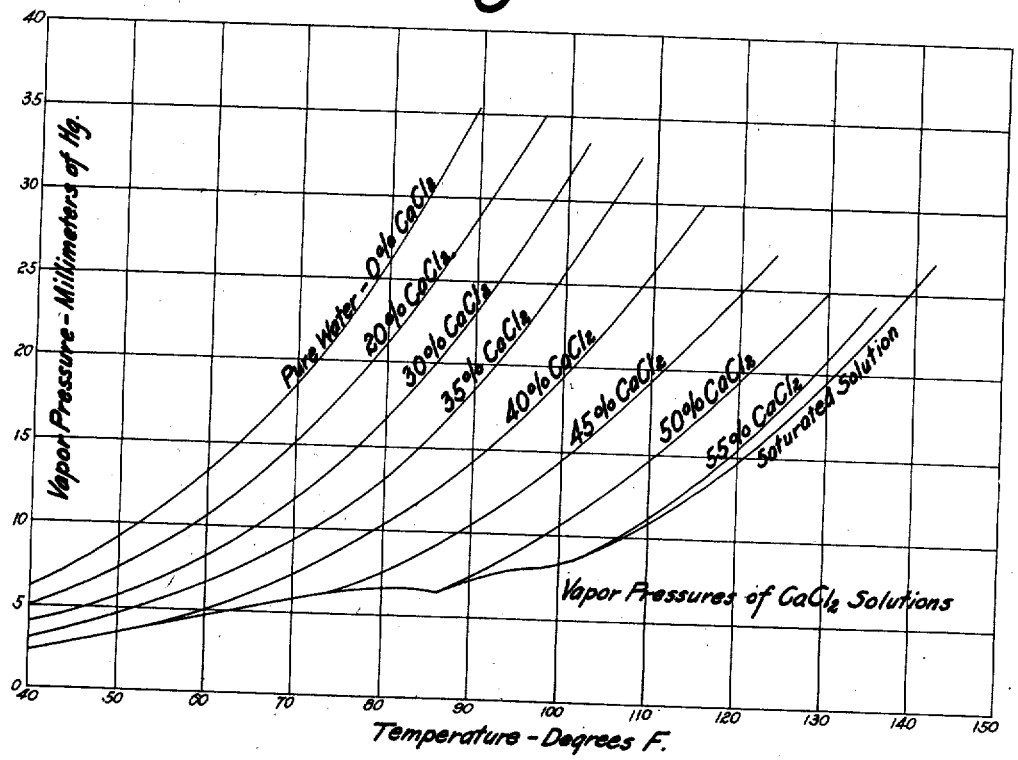

Patented Apr. 21, 1942

2,280,633

UNITED STATES PATENT OFFICE 2,280,633

AIR CONDITIONING

Robert B. P. Crawford, Athens, Ga.

Application December 20, 1939, Serial No. 310,229

13 Claims. (Cl. 183—120)

The invention relates to a novel method and apparatus for the conditioning of air and is particularly directed to a system of air conditioning wherein the air is contacted with hygroscopic solutions for removing latent heat and moisture from the air while simultaneously indirectly contacting the air with a heat transfer medium for removing sensible heat from the air.

The principal object of the invention is to provide a system of air conditioning of the chemical absorption type in which the differential between the aqueous vapor pressure of the hygroscopic solution and the aqueous vapor pressure of the air in contact with the solution is kept at a substantially uniform value.

An important object of the invention is to provide for the removal of latent and sensible heat from air in such manner and at such rates that the heat removing medium in indirect contact with the air is passed in truly counter-current relation to the air.

Another object of the invention is to so arrange and use the drying and cooling means in a chemical absorption system that a minimum area of surface is required.

The method of the invention comprises establishing a zone of contact of a stream of air with an extended surface of a hygroscopic solution, bringing a heat transfer medium into heat exchange relation with the hygroscopic solution in the zone of contact to provide a decreasing temperature gradient in the zone in the direction of flow of the stream of air, and supplying hygroscopic solution to the zone of contact intermediate the ends of the zone and preferably at a point where the temperature of the air stream is substantially the same as the temperature of the hygroscopic solution and the aqueous vapor pressures of the air and the solution are at a desired predetermined differential.

The point in the zone of contact at which the hygroscopic solution is supplied and the concentration of the hygroscopic solution will depend upon the conditions of the particular air conditioning installation, such as maximum load and required air conditions, and particularly upon the properties of the hygroscopic substance utilized in the installation.

By suitably selecting the point of supply of hygroscopic solution to the zone of contact with air and the temperature and concentration of the supplied solution, the efficiency of the dehumidification and cooling of the air stream may be greatly increased.

A particularly advantageous form of the invention comprises passing a stream of air successively through two extended surface streams of hygroscopic solution, the first flowing countercurrently to and the second concurrently with the air stream, and passing a stream of heat transfer medium serially through the zones of contact in heat transfer relation with the streams of hygroscopic solution and countercurrently to the air stream in both zones. In this form of the invention concentrated solution is supplied to the first stream of solution at a suitable point intermediate the ends thereof, while solution having an aqueous vapor pressure lower than the aqueous partial pressure of the air at the end of the first zone of contact is supplied to both streams.

The invention will be more particularly described with reference to the use of calcium chloride as the hygroscopic substance. The principles of the invention are illustrated in the accompanying drawings in which:

Fig. 1 is a diagrammatic representation of an air conditioning system embodying the principles of the invention; and Fig. 2 is a graph showing the relation of the vapor pressures of calcium chloride solutions to the temperature and concentration of the solution.

It is well known that the aqueous vapor pressure of a hygroscopic solution such as results from dissolving calcium chloride in water decreases with increase of concentration and increases with rise in temperature. But the vapor pressure does not change in regular relationship with changes in temperature and concentration. Referring to Fig. 2, it will be noted that the temperature of a calcium chloride solution can be lowered from about 76° F. to 53° F. without the solution becoming saturated and with considerable drop of vapor pressure (from 6.2 to 3.8 mm. of mercury), if the concentration is lowered proportionately from about 45% to 40%. But the temperature can be dropped through the range from 87° F. to 76° F. while the concentration is lowered from 50% to 45% without any appreciable drop in vapor pressure. It remains at about 6.2 mm. of mercury. Above 87° F. the vapor pressure rises rapidly with rise in temperature.

In view of the properties of calcium chloride solutions as represented in Fig. 2, it has been found to be particularly advantageous, when utilizing calcium chloride solutions in the air conditioning system of the invention, to supply to the zone of contact a solution of calcium chloride approaching 50% in concentration at a temperature of about 85° F., the solution being supplied at a point in the zone of contact where the dry bulb temperature of the air is approximately 85° F.

The air conditioning system shown as an illustrative example in Fig. 1 consists essentially of a dehumidifying and cooling chamber 10, divided, except for a horizontal passage at the top of the chamber, into two compartments 11 and 12 by vertical partition 13. In each compartment are positioned finned coils 14, 14' and 15, 15'. An air supply duct 16 opens into compartment 11 below coils 14 and air outlet duct 17 leaves compartment 12 below coils 15. A fan 18 serves to draw a stream of air through the conditioning chamber 10 and force the conditioned air to a space to be served.

Pump 19 forces a stream of cooling water from well 20, or other suitable source of supply, upward through coils 15, 15', downward through coils 14', 14, and thence to waste at 21. By suitable adjustment of valve 22 between coils 14' and 15' and valve 22' any desired portion of the cooling water stream may be by-passed from the top of coil 15, through heat interchanger 23 and thence to the top of coil 14.

Calcium chloride solution from sumps 24 and 25 is forced by pump 26 through heat interchanger 23 where it is brought to substantially the temperature condition of the air in the upper portion of chamber 10 and thence to sprays 27 and 28, in the upper portions of compartments 11 and 12 respectively. The proportion of the solution drawn from sumps 24 and 25 is adjusted to produce a solution having a concentration of 48 to 49%, and the relative coil surface area in compartments 11 and 12 is preferably designed to provide a dry bulb temperature at the top of conditioning chamber 10 of approximately 85° F.

The concentration of the hygroscopic solution is maintained by drawing off a portion of the solution from sump 25 to concentrator 29 where it flows over extended surface steam coil 30 and thence over packing material 31 counter-currently to a stream of air drawn upwardly through the concentrator by fan 32. Concentrated solution from the sump 33 of the concentrator is pumped by pump 34 to sprays 35. This solution is preferably cooled to a temperature a few degrees above its freezing point before being supplied to the compartment 11. If, for example, the concentration of this solution is about 55% calcium chloride, it is advantageously cooled in heat exchanger 36 to not lower than about 107° F. by means of a stream of water by-passed from the cooling water passing to waste by means of valve 37 controlled by thermostat 38. The strong solution from the concentrator is introduced into the compartment 11 at a point where its temperature is most nearly in equilibrium with the dry bulb temperature of the air stream.

At full load with water entering coil 15 at 75° F. and leaving coil 14 at 110° F. and air entering compartment 11 at 100° F., the solution in sump 25 will be about 44% and 77° F. and the solution in sump 24 will be about 53% and 112° F. Heat exchange between the solution in the sumps and the air stream may be minimized by means of perforated plate 39.

Thermostats 40 and 41, actuating valves 42 and 43 respectively, regulate the distribution of the solution between compartments 11 and 12. Thermostat 40 may be modulated by outdoor wet bulb thermostat 44 and thermostat 41 may be modulated by solution temperature thermostat 45. The compensating resistance potentiometer proportioning control devices 46 and 47 are interconnected electrically or mechanically through 48 so that the opening of one valve brings about a suitable opening of the other to compensate for the decreased pressure caused by the first opening. Valves 42 and 43 do not close entirely but merely act as pressure-volume controls on the solution supplied to compartments 11 and 12.

Interconnection 48 is so connected to the potentiometer compensating resistances that at maximum loads wet bulb thermostat 44 and solution thermostat 45 do not modulate the operation of thermostats 40 and 41, but only affect the solution volume and distribution at less than full loads.

Humidostat 49 in the conditioned air stream controls the supply of concentrated solution to sprays 35 through valve 50. Thermostat 51 in the conditioned air stream controls the supply of cooling medium to the conditioner through valve 52.

In the apparatus and method of operation which have been particularly described in illustration of the principles of the invention, the air stream is brought to the desired conditions of temperature and relative humidity in two stages. The primary action of the first stage is the removal of latent heat by the absorption of moisture from the air in a hygroscopic solution, while the primary action of the second stage is the removal of sensible heat. By introducing concentrated hygroscopic solution at an intermediate point in the first stage, the temperature of the air is raised by a substantial amount in the first part of the first stage due to the warming up of the hygroscopic solution by absorption of latent heat. This makes it possible to heat up the cooling water passing in counter-current relation through the first stage by a comparative amount, for example, from 85° F. to 110° F., thus greatly increasing the efficiency of utilization of the water.

In other words, a substantial part of the latent heat content of the air is removed therefrom at a temperature level at or above the original temperature of the air, thereby making it possible to absorb this heat from the system in a coolant which has already been used to reduce the previously dehumidified stream of air to the desired sensible heat content.

I claim:

1. A method of conditioning air which comprises passing a stream of air successively in contact with a first extended surface stream of hygroscopic solution flowing counter-currently to said air stream and with a second extended surface stream of hygroscopic solution flowing concurrently with said air stream, maintaining said streams of hygroscopic solution by supplying hygroscopic liquid to each of said streams at a concentration closely approaching saturation at the temperature of the air stream at the end of the first zone of contact, and passing a stream of a heat transfer medium serially through said zones of contact in heat transfer relation with said streams of hygroscopic solution and counter-currently to said air stream in both said zones.

2. A method of conditioning air which comprises passing a stream of air succesively in contact with a first extended surface stream of hygroscopic solution flowing counter-currently to said air stream and with a second extended surface stream of hygroscopic solution flowing concurrently with said air stream, maintaining said streams of hygroscopic solution by supplying hygroscopic liquid to each of said streams at a concentration closely approaching saturation at the temperature of the air stream at the end of the first zone of contact, passing a stream of a heat transfer medium serially through said zones of contact in heat transfer relation with said streams of hygroscopic solution and counter-currently to said air stream in both said zones, and supplying hygroscopic solution to said first stream intermediate the ends thereof at a concentration above the concentration of the hygroscopic solution supplied to both said streams and below the saturation concentration at the temperature of the air stream at the point of supply.

3. A method of conditioning air which comprises passing a stream of air successively in contact with a first extended surface stream of hygroscopic solution flowing counter-currently to said air stream and with a second extended surface stream of hygroscopic solution flowing concurrently with said air stream, maintaining said streams of hygroscopic solution by supplying hygroscopic liquid to each of said streams from a common source, passing a stream of a heat transfer medium serially through said zones of contact in heat transfer relation with said streams of hygroscopic solution and counter-currently to said air stream in both said zones, supplying hygroscopic solution to said first stream intermediate the ends thereof at a concentration above the concentration of the hygroscopic solution supplied to both said streams and below the saturation concentration at the temperature of the air stream at the point of supply, and utilizing at least a portion of the hygroscopic solution from said first stream as the common source of hygroscopic solution for both said streams.

4. A method of conditioning air which comprises passing a stream of air successively in contact with a first extended surface stream of hygroscopic solution flowing counter-currently to said air stream and with a second extended surface stream of hygroscopic solution flowing concurrently with said air stream, maintaining said streams of hygroscopic solution by supplying hygroscopic liquid to each of said streams from a common source, passing a stream of a heat transfer medium serially through said zones of contact in heat transfer relation with said streams of hygroscopic solution and counter-currently to said air stream in both zones, supplying hygroscopic solution to said first stream intermediate the ends thereof at a concentration above the concentration of the hygroscopic solution supplied to both said streams and below the saturation concentration at the temperature of the air stream at the point of supply, adjusting at least a portion of the hygroscopic solution from said first stream to a temperature approximately that of the air stream at the end of the first zone of contact, and supplying said solution to both said streams of solution.

5. A method of conditioning air which comprises passing a stream of air successively in contact with a first extended surface stream of hygroscopic solution flowing counter-currently to said air stream and with a second extended surface stream of hygroscopic solution flowing concurrently with said air stream, maintaining said streams of hygroscopic solution by supplying hygroscopic liquid to each of said streams from a common source, passing a stream of a heat transfer medium serially through said zones of contact in heat transfer relation with said streams of hygroscopic solution and counter-currently to said air stream in both said zones, supplying hygroscopic solution to said first stream intermediate the ends thereof at a concentration above the concentration of the hygroscopic solution supplied to both said streams and below the saturation concentration at the temperature of the air stream at the point of supply, bringing at least a portion of the hygroscopic solution from said first stream into heat transfer relation with said heat transfer medium between said first and second zones of contact, and supplying said solution to both said streams of solution.

6. A method of conditioning air which comprises passing a stream of air successively in contact with a first extended surface stream of calcium chloride solution flowing counter-currently to said air stream and with a second extended surface stream of hygroscopic solution flowing concurrently with said air stream, maintaining said extended surface streams by supplying to each of said streams calcium chloride solution at a concentration of about 48.5% and at a temperature of approximately 85° F., and passing a stream of heat transfer medium serially through said zones of contact in heat transfer relation with said streams of hygroscopic solution and counter-currently to said air stream in both said zones.

7. A method of conditioning air which comprises passing a stream of air successively in contact with a first extended surface stream of calcium chloride solution flowing counter-currently to said air stream and with a second extended surface stream of hygroscopic solution flowing concurrently with said air stream, maintaining said extended surface streams by supplying to each of said streams calcium chloride solution at a concentration of about 48.5% and at a temperature of approximately 85° F., and a temperature approximately the same as the temperature of the air stream at the end of the first zone of contact, and passing a stream of heat transfer medium serially through said zones of contact in heat transfer relation with said streams of hygroscopic solution and counter-currently to said air stream in both said zones.

8. A method of conditioning air which comprises passing a stream of air successively in contact with a first extended surface stream of calcium chloride solution flowing counter-currently to said air stream and with a second extended surface stream of hygroscopic solution flowing concurrently with said air stream, maintaining said extended surface streams by supplying to each of said streams calcium chloride solution at a concentration of about 48.5%, passing a stream of heat transfer medium serially through said zones of contact in heat transfer relation with said streams of hygroscopic solution and counter-currently to said air stream in both said zones, and supplying calcium chloride solution at a concentration of about 53% to said first stream intermediate the ends thereof.

9. A method of conditioning air which comprises passing a stream of air successively in contact with a first extended surface stream of calcium chloride solution flowing counter-currently to said air stream and with a second extended surface stream of hygroscopic solution flowing concurrently with said air stream, maintaining said extended surface streams by supplying to each of said streams calcium chloride solution at a concentration of about 48.5% and at a temperature of approximately 85° F., passing a stream of heat transfer medium serially through said zones of contact in heat transfer relation with said streams of hygroscopic solution and counter-currently to said air stream in both said zones, combining hygroscopic solution from said streams in proportion to give a concentration of about 46.5%, and supplying said solution to both said streams of solution.

10. A method of conditioning air which comprises passing a stream of air successively in contact with a first extended surface stream of calcium chloride solution flowing counter-currently to said air stream and with a second extended surface stream of hygroscopic solution flowing concurrently with said air stream, maintaining said extended surface streams by supplying to each of said streams calcium chloride solution at a concentration of about 48.5%, passing a stream of heat transfer medium serially through said zones of contact in heat transfer relation with said streams of hygroscopic solution and counter-currently to said air stream in both said zones, concentrating at least a portion of the solution from said second stream to a concentration of about 53% calcium chloride, supplying the concentrated solution to said first stream intermediate the ends thereof, combining hygroscopic solution from said streams in proportion to give a concentration of about 48.5%, and supplying said solution to both said streams of solution.

11. Apparatus for the conditioning of air comprising means defining two chambers, means for passing a stream of air to be conditioned successively upward through one of said chambers and downward through the other of said chambers, extended surface conduits in each of said chambers adapted for the flow of heat transfer fluid therethrough in an upward direction in the second chamber and thereafter in a downward direction in said first chamber, means for supplying hygroscopic solution to the upper portion of each of said chambers, means for concentrating hygroscopic solution, and means for conveying hygroscopic solution from the bottom of said chambers to said concentrating means and from said concentrating means to said first chamber intermediate the ends thereof.

12. Apparatus for the conditioning of air comprising means defining two chambers, means for passing a stream of air to be conditioned successively upward through one of said chambers and downward through the other of said chambers, extended surface conduits in each of said chambers adapted for the flow of heat transfer fluid therethrough in an upward direction in the second chamber and thereafter in a downward direction in said first chamber, means for supplying hygroscopic solution to the upper portion of each of said chambers, means for concentrating hygroscopic solution, means for conveying hygroscopic solution from the bottom of said chambers to said concentrating means and from said concentrating means to said first chamber intermediate the ends thereof and means for conveying hygroscopic solution from the bottom to the top of said chambers, including heat transfer means for bringing said solution into heat transfer relation with heat transfer fluid from the extended surface conduits in said second chamber.

13. Apparatus for the conditioning of air comprising means defining two chambers, means for passing a stream of air to be conditioned successively upward through one of said chambers and downward through the other of said chambers, extended surface conduits in each of said chambers adapted for the flow of heat transfer fluid therethrough in an upward direction in the second chamber and thereafter in a downward direction in said first chamber, means for supplying hygroscopic solution to the upper portion of each of said chambers, means for concentrating hygroscopic solution, and means for conveying hygroscopic solution from the bottom of said chambers to said concentrating means and from said concentrating means to said first chamber intermediate the ends thereof, including heat transfer means for bringing the concentrated solution into heat transfer relation with heat transfer fluid from the extended surface conduits in said first chamber.

ROBERT B. P. CRAWFORD.